April 19, 1938. B. F. CONNER 2,114,872

COTTON DISPENSING CONTAINER

Filed Dec. 1, 1936

Inventor
Benjamin F. Conner
By S. Jay Teller
Attorney

Patented Apr. 19, 1938

2,114,872

UNITED STATES PATENT OFFICE 2,114,872

COTTON DISPENSING CONTAINER

Benjamin F. Conner, West Hartford, Conn., assignor to Colt's Patent Fire Arms Manufacturing Company, Hartford, Conn., a corporation of Connecticut Application December 1, 1936, Serial No. 113,638

3 Claims. (Cl. 206—63.5)

The principal object of the invention is to provide a cotton dispensing container which is efficient and convenient as to its function of dispensing cotton, which is adapted when not in use to protect the cotton from dust and other contamination, which is adapted to be readily refilled when required, and which in its entirety is highly attractive in appearance.

In the accompanying drawing I have shown one suitable embodiment of the invention but it will be understood that the drawing is intended for illustrative purposes only and is not to be construed as defining or limiting the scope of the invention, the claims forming a part of this specification being relied upon for that purpose.

Figure 1:
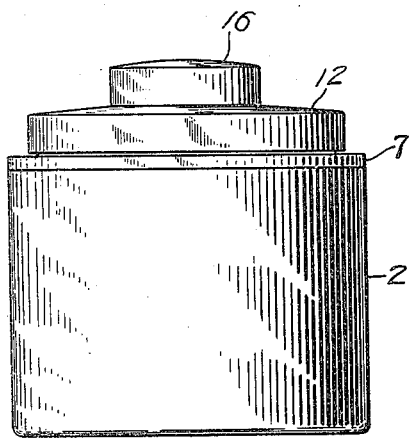
Fig. 1 is a side view of a dispensing container embodying the invention.

The container as shown in the drawing comprises a main body which is open at the top and which is externally threaded. This container body may be widely varied as to details of construction but I have shown and prefer to use a construction similar to that disclosed in my patent for Jars, No. 2,077,215 dated April 13, 1937.

The container body as shown and as described in the said patent comprises two main portions 1 and 2. The member 1 is designated as the inner or containing member, and the member 2 is designated as the outer or base member.

The inner or containing member 1 is a thin-walled cup-shaped member preferably molded from a material of the synthetic resin class and it is preferably of such shape that its interior diameter at the top is at least as large as the interior diameter below the top. The bottom wall of the containing member is indicated at 3. The containing member 1 is threaded adjacent its upper periphery as indicated at 4, being thus adapted for engagement with a threaded closure of the cap type.

The outer or base member 2 is so related to the containing member 1 as to permit the said containing member to be assembled vertically downward with respect thereto. The base member has a peripheral annular portion 5 which is in engagement adjacent its top with an annular portion of the containing member 1, and the base member preferably has a bottom wall 6 which is positioned beneath the containing member. The annular portion 5 of the base member preferably surrounds the entire lower portion of the containing member and is spaced outward therefrom. The containing member 1 is provided with a thin outward projecting annular flange 7 immediately below the threads at 4, this flange being of such size and so positioned that the bottom surface thereof is engaged by the top edge of the annular portion 5 of the base member. The flange 7 is provided at 8 with a rabbet which serves to prevent lateral displacement of one of the members with respect to the other.

Projecting downward from the bottom wall 3 of the containing member 1 are four relatively small plugs 9, 9 which are located at uniform distances from the axis of the container body and which are preferably spaced apart uniformly or substantially so. Formed on the bottom wall 6 of the outer or base member 2 are four sockets 10, 10 of such size and so positioned as to be adapted to receive the said plugs 9, 9. On account of the substantially uniform spacing it is possible for the two members 1 and 2 to be assembled in any one of four angularly different relationships.

Preferably the several plugs 9, 9 have their main body portions smaller than the sockets and are provided with a plurality of narrow vertical fins 11, 11 which project radially outward from the body of the plug. These fins provide narrow bearing surfaces for engagement with the inner walls of the sockets, and they tend to cut into the socket walls to provide a firmer engagement. In this way the two container members are firmly held in engagement with each other.

The main cover for the container is designated as an entirety by 12. The cover 12 is substantially flat at the top although if preferred may be slightly domed as shown. The cover has at its periphery a depending internally threaded cylindrical flange 13 and is thus adapted to engage the threaded portion of the main container body. The cover 12 is further provided with a centrally located upstanding cylindrical flange 14 of substantially smaller diameter than the depending flange 13. The flange 14 surrounds a central cotton dispensing opening 15 and it is externally threaded so as to be adapted for engagement by an internally threaded auxiliary cap or cover 16. An inward projecting annular rib 17 is preferably provided within the opening 15, this rib restricting the diameter of the opening and engaging the cotton therein. Preferably there is provided an annular series of inward projecting integral cotton engaging teeth 18 within the central opening and at the periphery thereof. When there is an annular rib such as 17, the teeth 18 are formed integrally with the rib at the inner edge thereof. The rib 17 and the teeth 18 are preferably located entirely within the dispensing opening 15 and above the plane of the bottom thereof. This facilitates molding and is further ordinarily advantageous for the reason that it leaves the interior of the container unobstructed so that it can initially be completely filled with cotton.

Figure 2:
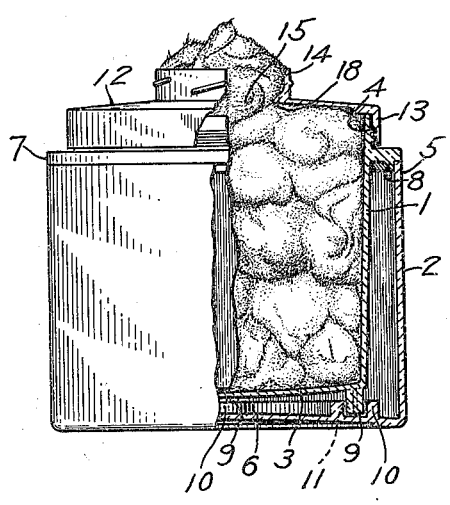
Fig. 2 is a view similar to Fig. 1 with the auxiliary cover removed and with the container shown partly in vertical central section.

The main cover 12 is readily removable to permit the container to be entirely filled with cotton as indicated in Fig. 2. With the container thus filled and with the main and auxiliary covers in their normal positions as shown in Fig. 1, the cotton is completely protected from dust and other contamination. When the auxiliary cover 16 is removed, as indicated in Fig. 2, a portion of the cotton can be pulled up through the dispensing opening 15 and small amounts thereof can be picked off as required for use. After the required amount of cotton has been pulled or picked off, the auxiliary cover 16 can be restored to position to again protect the cotton.

Figure 3:
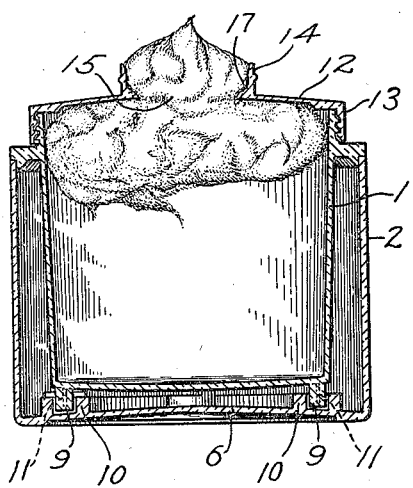
Fig. 3 is a vertical central sectional view showing the position of the cotton in the container when only a small portion thereof remains.
Figure 4:
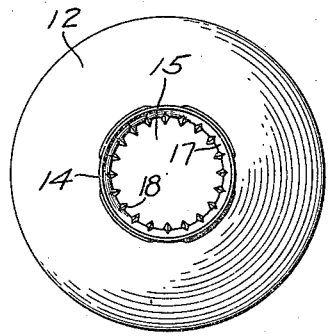
Fig. 4 is a plan view of the main cover for the container.

The inward projecting annular rib 17 and the integral teeth 18 thereon serve to resist the movement of the cotton through the dispensing opening. The rib and the teeth thus serve to prevent undesirably large quantities of the cotton from being pulled out and they also prevent the cotton from dropping down to the bottom of the container after the quantity of the cotton in the container has been depleted. As shown in Fig. 3, the rib and the teeth will support a relatively small portion of the total quantity of the cotton near the top of the container so that it can be pulled out through the dispensing opening 15 in the manner already described.

At least the inner member of the container body and the main and auxiliary covers are preferably molded from materials of the synthetic resin class. When so molded these parts have highly polished or glossy surfaces which adapt them to be thoroughly cleansed not only prior to the first filling of the container but also upon subsequent refillings thereof. The internal rib and integral teeth at the dispensing opening are integral with the main cover and are rigid. For the reasons stated a dispensing container embodying the present invention is adapted to be repeatedly refilled and to be used indefinitely, this being in contrast with various paper and cardboard containers of the prior art which are neither intended nor adapted to be used after the initial contents have been dispensed.

The formation of the various parts of the container from molded materials of the synthetic resin class, in addition to the advantages already pointed out, makes it possible for the container to have a highly attractive appearance thus adding to its utility and desirability. The different parts of the container can be made with different colors and the externally exposed portions thereof may be formed with ornamental contours and designs.

What I claim is:

1. A cotton dispensing container comprising in combination a main container body open at the top and externally threaded, the said container body having its interior diameter at the top at least as large as is the interior diameter below the top, a removable molded substantially flat rigid cover for the container body having at its periphery a depending cylindrical flange internally threaded to engage the threaded portion of the body, the said cover having a centrally located upstanding externally threaded cylindrical flange of substantially smaller diameter than the said depending flange and surrounding a central cotton dispensing opening and the said cover also having an annular integral cotton engaging rib projecting inward into the said central opening above the bottom plane thereof, and a removable auxiliary cover internally threaded to normally engage the threaded upstanding flange, the said auxiliary cover normally closing the central cotton dispensing opening and protecting any cotton therein.

2. A cotton dispensing container comprising in combination a main container body open at the top and externally threaded, the said container body having its interior diameter at the top at least as large as is the interior diameter below the top, a removable molded substantially flat rigid cover for the container body having at its periphery a depending cylindrical flange internally threaded to engage the threaded portion of the body, the said cover having a centrally located upstanding externally threaded cylindrical flange of substantially smaller diameter than the said depending flange and surrounding a central cotton dispensing opening and the said cover also having an annular integral cotton engaging rib with an annular series of teeth thereon projecting inward into the said central opening above the bottom plane thereof, and a removable auxiliary cover internally threaded to normally engage the threaded upstanding flange, the said auxiliary cover normally closing the central cotton dispensing opening and protecting any cotton therein.

3. A molded substantially flat rigid cover for a cotton dispensing container, comprising at its periphery a depending internally threaded cylindrical flange, comprising a centrally located upstanding externally threaded cylindrical flange of substantially smaller diameter than the said depending flange and surrounding a central cotton dispensing opening, and comprising an annular integral cotton engaging rib with an annular series of teeth thereon projecting inward into the said central opening above the bottom plane thereof.

BENJAMIN F. CONNER.